E. S. SAVAGE.
CHUCK.
APPLICATION FILED APR. 17, 1907.

913,059.

Patented Feb. 23, 1909.

WITNESSES:
Clarence W. Carroll
W. Gurnee.

INVENTOR
Edward S. Savage
by Osgood Davis
his attys

UNITED STATES PATENT OFFICE.

EDWARD S. SAVAGE, OF ROCHESTER, NEW YORK.

CHUCK.

No. 913,059.    Specification of Letters Patent.    Patented Feb. 23, 1909.

Application filed April 17, 1907. Serial No. 368,777.

*To all whom it may concern:*

Be it known that I, EDWARD S. SAVAGE, a citizen of the United States, and resident of Rochester, in the county of Monroe and State of New York, have invented certain new and useful Improvements in Chucks, of which the following is a specification.

This invention relates to chucks, and has for its object the production of a strong and compact device, in which, by the movement of one member, a set of jaws may be brought into clamping contact with the article to be held, and then by movement of a second member, an extremely powerful clamping effect may be applied to said jaws.

A further object of the invention is to construct the actuating members so that they may be moved with sufficient force by hand, and thus to obviate the use of a lever or wrench, which is very easily lost or mislaid.

Figure 1:
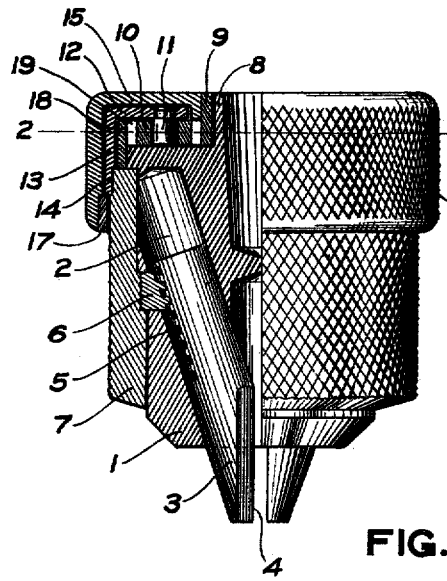
Figure 2:
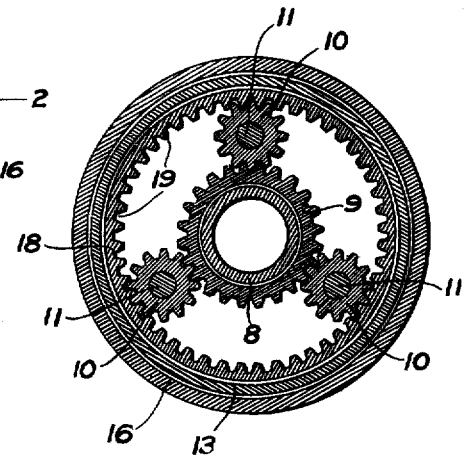
Figure 3:
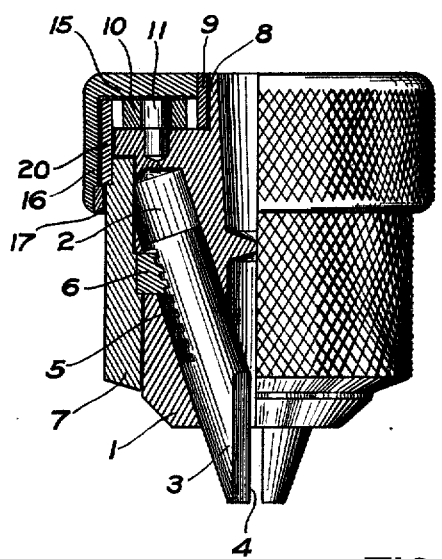
Figure 4:
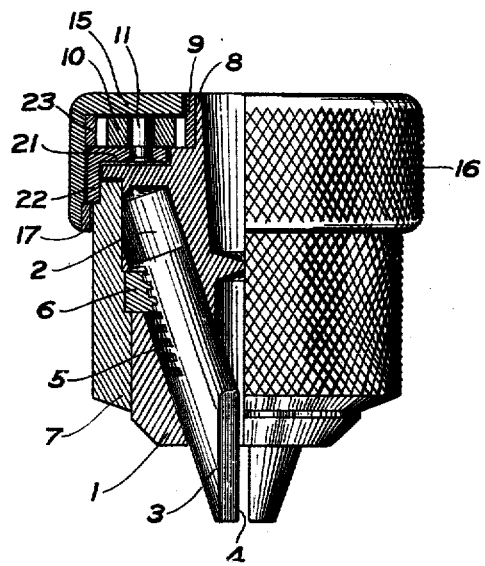

In the drawings:—Figure 1 is an elevation, partially in section, of a chuck embodying this invention; Fig. 2 is a section on line 2—2 of Fig. 1; and Figs. 3 and 4 are elevations, partially in section, showing modified forms of the device.

This invention may be adapted to any form of chuck in which a set of movable jaws are used to grip the article which is to be held in the chuck.

In the form shown herewith, the chuck has a body 1, in which are a number of recesses 2, converging toward the outer end of the chuck. Each of said recesses is adapted to receive a jaw 3, of such shape in cross-section as to prevent it from turning, and which has an engaging edge 4. The jaws 3 have screw-threads 5 cut on their outer faces, which are engaged by interior screw-threads on a ring 6. Fixed to the ring 6 is an encircling sleeve 7, knurled on its outer surface to afford a secure hand grip. The sleeve 7 and ring 6 together form one actuating member, and by rotating said sleeve the bars 3 are moved outwardly or inwardly in the recesses 2, and toward or away from each other, respectively.

The body 1 of the chuck has an upwardly-extending boss 8, loosely encircled by a pinion 9 (Figs. 1 and 2). The teeth of said pinion engage with one or more pinions 10, journaled on studs 11 in a disk 12. The disk 12 has a downturned flange or rim 13 which is pinned or otherwise fixed to the sleeve 7 at 14.

Surrounding the disk 12 and part of the sleeve 7 is a cap 15, suitably fixed to the pinion 9, or made integral therewith. Said cap and pinion constitute a second actuating member. A knurled flange 16 on the cap 15 has a ring 17 fastened or driven into it, which overlaps the flange 13 of the disk 12 and prevents the said cap from becoming displaced. The ring 17 is not fastened or driven into position until all the parts are assembled.

Surrounding the upper part of the chuck-body 1, and fixed thereto, is a ring 18, having teeth 19 on its inner periphery constituting an internal gear. Said teeth at all times engage the pinions 10.

The jaws 3 are brought to clamping position by rotating the sleeve 7 by hand. Then to tighten the chuck further, the cap 15 is rotated by hand. The pinion 9 revolves with said cap, while the ring 18 remains stationary. The pinions 10 engaging both the ring 18 and the pinion 9, move at a slower speed than the latter, and carry with them the disk 12 and the sleeve 7. The pinions are so proportioned with respect to each other that the sleeve 7 turns at a slower speed than the cap 15. This results from the planetary movement of the pinions 10 and thus more power is applied to said sleeve than would be possible with the ordinary chuck in which a single sleeve is turned directly by hand.

The chuck shown in Fig. 3 is so constructed that the sleeve 7 and cap 15 turn in opposite directions to produce a clamping effect. In this case the cap 15 is fixed to the central pinion 9 as before, but the studs 11 on which the pinions 10 revolve are held in the chuck-body 1. The said pinions 10, therefore, are not capable of planetary movement with respect to the pinion 9. The internal gear 20 is fastened to the sleeve 7, and meshes with the stationary pinions 10.

If the cap 15 is turned to the right, the pinion 9 turns therewith and revolves the pinions 10 on their stationary pivots. It accordingly follows that the direction of rotation of both the pinions 10 and the ring 20 (with the sleeve 7) is opposite to that of the cap 15. This form of chuck may be operated by grasping the sleeve 7 with one hand and the flange 16 with the other, and then turning said sleeve and flange in opposite directions. In this case the sleeve 7 turns more slowly than the cap 15, and the clamping force resulting from the "gearing down" is very powerful. The bars or jaws 3, therefore, clamp the drill between them with great firmness. The same leverage is also available for releasing the chuck from the drill, as the pinions then revolve at the same relative speeds in the opposite direction.

Fig. 4 is illustrative of a modification in which the relation of driving member to driven member is exactly opposite to the form of chuck shown in Figs. 1 and 2. The pinion 9 in this instance is fixed to the boss 8 on the chuck-body 1, and therefore remains stationary with respect thereto. The pinions 10 are pivoted in the upper side of a disk 21, and the downwardly-turned edge 22 of said disk is made fast to the sleeve 7. An internal gear 23 is pinned to the inside of the cap 15, and engages all the pinions 10. When the cap 15 is revolved, the ring 23 tends to carry the pinions 10 around with it, but the latter, being in engagement with the stationary pinion 9, are moved at a slower rate than the cap 15 and ring 23, being in effect, retarded by the pinion 9. The sleeve 7 is turned, therefore, at a slower speed than said cap, but with greatly increased power or leverage. The said sleeve and cap move in the same direction. Obviously the leverage or increased clamping force to be obtained through the geared connection between the cap 15 and the sleeve 7 is dependent upon the relative diameter of the gears and pinions.

In the drawings, three pinions 10 are shown, but the device is operative with only one pinion 10. More than one pinion 10 spaced equidistant apart is, however, preferable, both because greater strength is secured thereby, and because this arrangement avoids a one-sided thrust and excessive friction of the moving parts which would result from the use of only a single pinion 10.

What I claim is:—

1. A chuck consisting of a chuck-body carrying the following parts:—movable clamping jaws, a ring carried by said body and adapted by rotation to move said jaws and having a gear of one diameter, a second concentric ring carried by said body and having a gear of another diameter, and gearing connection between said two gears for rotating the first ring by rotation of the second ring.

2. A chuck consisting of a chuck-body carrying the following parts:—movable clamping jaws, a ring carried by said body and adapted to engage and to move said jaws, a gear fixed on said body, a gear movable on said body, a second ring surrounding said body and connected to said movable gear, a pinion connecting said gears, and means for moving said first ring on movement of said second ring.

3. A chuck consisting of a chuck-body carrying the following parts:—movable clamping jaws, a first ring carried by said body and adapted to engage and to move said jaws, a gear fixed on said body, a gear movable on said body, a second ring surrounding said body and connected to said movable gear, and a pinion connecting said gears and carried with said first ring.

4. A chuck consisting of a chuck-body carrying the following parts:—movable clamping jaws, a revoluble part adapted to engage said jaws to move them to and from each other, an independently revoluble part, power increasing gearing between the two revoluble parts consisting of an internally toothed ring, an inner gear, and an intermediate gear, one of which gears is stationary and another of which is movable with said independently revoluble part.

5. A chuck consisting of a chuck-body carrying the following parts:—movable clamping jaws, a ring adapted to engage said jaws to move them to and from each other, an independently revoluble ring, and power-increasing gearing between the two rings consisting of an internal gear, an external gear, and an intermediate gear, one of which gears is stationary and another of which is attached to said independently revoluble ring.

6. A chuck consisting of a chuck-body carrying the following parts:—movable clamping jaws, a ring carried by said body and adapted by rotation to move said jaws and having a gear of one diameter, a second ring carried by said body and having a gear of another diameter, and a gear meshing with both of said two gears for rotating the first ring by rotation of the second ring.

7. A chuck consisting of a chuck-body carrying the following parts:—movable clamping jaws; a ring movable relatively to the body for opening and closing said jaws; and a power-increasing gearing for operating said ring, consisting of an internal gear and an external gear, and a connecting gear, one of which gears is attached to the chuck body, another of which is attached to the ring, and the third of which is the operating member for the gearing and is movable relatively to the body.

EDWARD S. SAVAGE.

Witnesses:
D. GURNEE,
L. THON.